(12) United States Patent
Barmoav et al.

(10) Patent No.: US 10,230,255 B2
(45) Date of Patent: Mar. 12, 2019

(54) APPARATUS, METHOD AND SYSTEM FOR PROVIDING EXPANDED FUNCTIONALITY TO COMMUNICATION DEVICES USING WIRELESS CHARGING COIL-IN-COIL

(71) Applicant: MOTOROLA SOLUTIONS, INC, Schaumburg, IL (US)

(72) Inventors: Felix Barmoav, Reshon Leziyyon (IL); Haim Kahlon, Shoam (IL); Leonid Michelson, Ashdod (IL); Vitaliy Gurevich, Rishon Lesion (IL); David Moallem, Ramat-Gan (IL); Hadi Shvartz, Bat Hadar (IL); Uzi Cohen, Shoham (IL); Haim Slotin, Oranit (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 373 days.

(21) Appl. No.: 14/877,540

(22) Filed: Oct. 7, 2015

(65) Prior Publication Data
US 2017/0104355 A1 Apr. 13, 2017

(51) Int. Cl.
| H02J 7/00 | (2006.01) |
| H02J 7/14 | (2006.01) |
| H02J 7/02 | (2016.01) |
| H04B 5/00 | (2006.01) |
| H01F 38/14 | (2006.01) |
| H02J 50/10 | (2016.01) |

(Continued)

(52) U.S. Cl.
CPC .............. *H02J 7/025* (2013.01); *H01F 38/14* (2013.01); *H02J 7/0042* (2013.01); *H02J 50/10* (2016.02); *H02J 50/90* (2016.02); *H04B 5/0037* (2013.01); *H04W 4/80* (2018.02)

(58) Field of Classification Search
USPC ........ 320/107, 108, 109, 132, 114, 115, 112, 320/134
See application file for complete search history.

(56) References Cited

U.S. PATENT DOCUMENTS

| 5,923,544 A * | 7/1999 | Urano ..................... H02J 7/025 |
| | | 307/104 |
| 6,208,115 B1 * | 3/2001 | Binder .................... H02J 7/022 |
| | | 307/66 |

(Continued)

FOREIGN PATENT DOCUMENTS

| EP | 2573900 A1 | 3/2013 |
| EP | 2884626 A1 | 6/2015 |
| WO | 2014054399 A1 | 4/2014 |

OTHER PUBLICATIONS

VoltNow—Qi vs PMA vs A4WP—Extracted from http/voltnow.com/blogs/news/17509765—Mar. 12, 2015—Copyright 2015 VoltNow—2 pages.

*Primary Examiner* — Alexis B Pacheco
(74) *Attorney, Agent, or Firm* — Barbara R. Doutre (57) ABSTRACT

A coil-in-coil structure (100) is formed within two devices (106, 108). The coil-in-coil structure (100) enables both wireless charging and secure pairing between the two devices (106, 108). The coil-in-coil structure (100) permits expanded wireless functionality using a single transmit coil (104) at a host radio device (108) and a receive coil (102) at an accessory device (106). A plurality of different accessory devices (606) can be interchangeably accommodated via a single host port (114) of the radio device (108).

31 Claims, 7 Drawing Sheets

(51) Int. Cl.
  *H02J 50/90*  (2016.01)
  *H04W 4/80*  (2018.01)

(56) References Cited

U.S. PATENT DOCUMENTS

| | | | | |
|---|---|---|---|---|
| 6,906,495 | B2 * | 6/2005 | Cheng | H01F 3/02 |
| | | | | 320/108 |
| 6,943,666 | B2 * | 9/2005 | Mooney | H02J 7/0045 |
| | | | | 307/10.3 |
| 8,193,769 | B2 * | 6/2012 | Azancot | H02J 7/025 |
| | | | | 320/108 |
| 8,265,326 | B2 * | 9/2012 | Singh | H04M 1/0258 |
| | | | | 379/433.02 |
| 8,853,891 | B2 | 10/2014 | Soar | |
| 2008/0167088 | A1 * | 7/2008 | Rabu | G06F 1/1632 |
| | | | | 455/573 |
| 2010/0170833 | A1 | 6/2010 | Grzonka et al. | |
| 2011/0028091 | A1 | 2/2011 | Higgins et al. | |
| 2011/0031928 | A1 | 2/2011 | Soar | |
| 2011/0127953 | A1 * | 6/2011 | Walley | G06K 7/10207 |
| | | | | 320/108 |
| 2011/0210696 | A1 * | 9/2011 | Inoue | H01F 27/365 |
| | | | | 320/108 |
| 2011/0241617 | A1 * | 10/2011 | Hoffman | H01M 10/46 |
| | | | | 320/108 |
| 2012/0235636 | A1 * | 9/2012 | Partovi | H02J 7/025 |
| | | | | 320/108 |
| 2013/0165046 | A1 * | 6/2013 | Tang | H04B 7/00 |
| | | | | 455/41.2 |
| 2013/0300348 | A1 * | 11/2013 | Schwartz | H02J 7/0052 |
| | | | | 320/107 |
| 2014/0242928 | A1 | 8/2014 | Kang et al. | |
| 2014/0314170 | A1 | 10/2014 | Plumb et al. | |
| 2015/0044966 | A1 | 2/2015 | Shultz et al. | |
| 2015/0048790 | A1 * | 2/2015 | Rudser | H02J 7/025 |
| | | | | 320/108 |
| 2016/0075249 | A1 * | 3/2016 | Grabar | B60L 11/1846 |
| | | | | 320/108 |

\* cited by examiner

APPARATUS, METHOD AND SYSTEM FOR PROVIDING EXPANDED FUNCTIONALITY TO COMMUNICATION DEVICES USING WIRELESS CHARGING COIL-IN-COIL

FIELD OF THE DISCLOSURE

The present disclosure relates generally to a radios and accessories and more particularly to expanding the functionality between a radio and an accessory through the use of a coil-in-coil wireless charging interface structure.

BACKGROUND

Figure 1A:
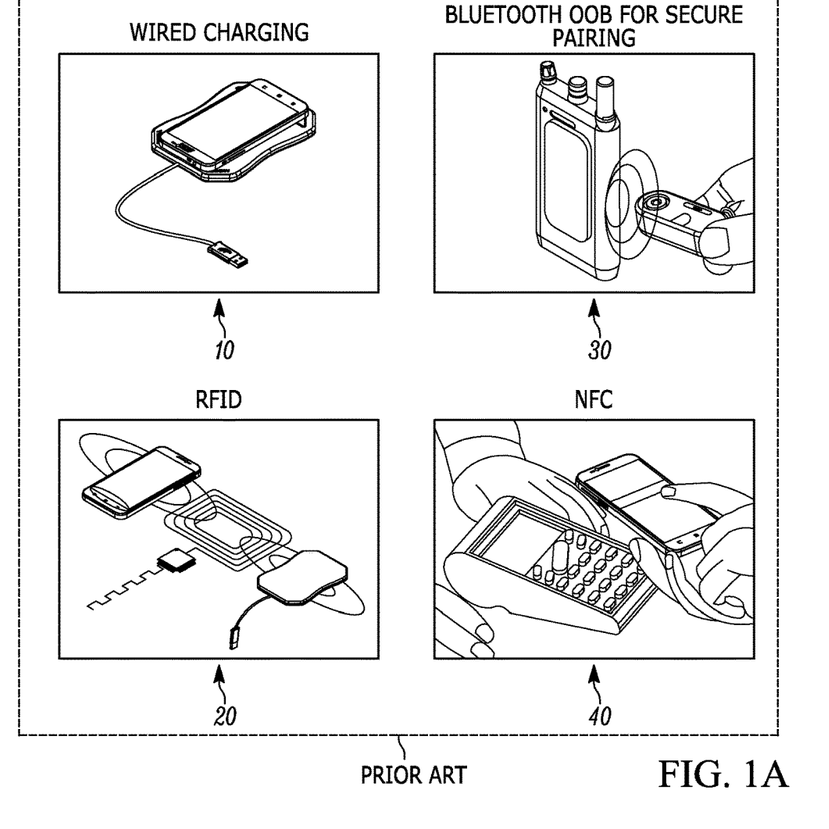
FIG. 1A shows examples of prior art short range accessory devices.

Current technologies tend to require different protocols, charging schemes and cabling interfaces when pairing an accessory device to a host communication device. For example, managing a plurality of electronic accessories that can be used with a radio can become cumbersome when it comes to charging, transferring data and pairing devices. In addition to the user interface, different electrical and mechanical arrangements present challenges when designers are faced with a limited amount of product real estate having to support different devices and technologies. Past approaches, shown for example in FIG. 1A, include wired charging 10, separated RFID reading 20, BLUETOOTH Out of Band pairing 30, Near Field Communication (NFC) 40, all having dedicated mechanical alignment interfaces and electrical circuits causing portability issues. Thus, designers and end users would benefit from a simplified approach that would expand functionality of a radio-to-accessory interface as well as the ability to manage different accessories through that interface.

Accordingly, it would be desirable to have an improved apparatus, system and method that would allow expanded functionality through a common interface between a host communication device and an accessory. It would be beneficial if the expanded functionality could accommodate different technologies. It would be a further benefit if the common interface would also permit the interchangeability of a plurality of different accessory devices operating over different technologies.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein an apparatus, method and system for both wireless charging and enablement of expanded communication system functionality. In accordance with the various embodiments a coil-in-coil structure is formed and used for both charging and the expanded functionality. A communication device, such as a portable radio, comprises a transmit coil, while an accessory comprising a receive coil, is insertable into the radio to form the coil-in-coil structure. The completed coil-in-coil structure provides for wireless charging of the accessory as well as expanded functionality using the same coil. The coil-in-coil structure enables charging of the accessory along with at least one of a plurality of other technologies, such as RFID, NFC, and BLUETOOTH pairing to name a few) which operate via the same coil-in-coil structure accordance with various embodiments. Thus, an electronic accessory having a battery can be charged by coupling the accessory having the receiver coil to the electronic device having the transmitter coil.

Figure 1B:
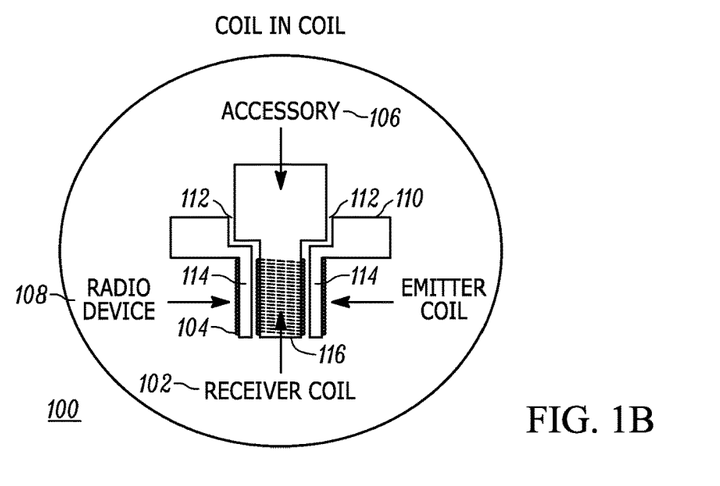
FIG. 1B is a coil-in-coil structure formed in accordance with some embodiments.

FIG. 1B is a coil-in-coil structure 100 formed in accordance with some embodiments. The coil-in-coil structure 100 provides an apparatus which can be incorporated into a communication system to provide for both wireless charging and expanded communication system functionality. The coil-in-coil structure 100 comprises a receive coil 102 and a transmit coil 104, wherein the receive coil is a helical coil formed within an accessory 106, and the transmit coil is helical coil formed within a portable radio 108. The portable radio 108 is formed of a radio housing 110 having an aperture 112. Aperture 112 leads into a host port 114 about which the transmit coil 104 is wound. The accessory 106 comprises a plug-in portion 116 within which the helical receive coil 102 is wound. In accordance with various embodiments the plug-in portion 116 of the accessory 106 is insertable into the aperture 112 of host port of 114 of radio 108 to form the coil-in-coil structure 100. Once plugged in, the transmit coil 104 surrounds and wraps around the receive coil 102 thereby allowing for inductive coupling to occur between the two coils. In accordance with the various embodiments, the coil-in-coil structure further enables at least one other wireless technology using the same transmit coil 104.

The coil-in-coil structure 100 provides the expanded functionality options between the radio 108 and the accessory and/or between the radio 108 and a plurality of other accessories. The coil-in-coil structure 100, as will be described in accordance with the further embodiments, provides a simplified approach to charging an accessory and expanding functionality through the single transmit coil 104.

The past approaches of accessory charging and pairing which all had dedicated mechanical alignment interface and electrical protocols causing portability issues can all be simplified using the coil-in-coil 100 approach of the various embodiments.

Short-range wireless communications covers a number of different wireless technologies that have been developed for very short distances. Examples of short range wireless communication include, but are not limited to, BLUETOOTH (BT), (near field communication) NFC, infrared, wireless local area network (WLAN), and Zigbee. For the purposes of this application, the following terms will be defined. These terms are not intended to limit the embodiments but simply to clarify usage of some of the terms. BLUETOOTH is a wireless technology standard for exchanging data over short distances from fixed and mobile devices. Near field communication (NFC) is a set of protocols that enable electronic devices to establish radio communication with each other by touching the devices together, or bringing them into proximity to a distance of typically 10 cm or less. BLUETOOTH Out of band (OOB) Pairing is a method that uses an external means of communication, such as Near Field Communication (NFC) to exchange some information used in the pairing process. Pairing is completed using the Bluetooth radio, but requires information from the OOB mechanism. A wireless local area network (WLAN) is a wireless computer network that links two or more devices using a wireless distribution method (often spread-spectrum or orthogonal frequency-division multiplexing (OFDM) within a limited area such as a home, school, computer laboratory, or office building. Zigbee is a wireless communication technology for short-range, low-power digital radio communications. Relative to BLUETOOTH, Zigbee uses very little power and has a low data transfer rate.

In accordance with the various embodiments, secure pairing and charging (two functions) occur using the same coil-in-coil structure 100 prior to the accessory 106 being extracted from the radio 108. Secure pairing of the various embodiments further provides for the exchange of encryption keys (codes) from the host to the accessory via the coil-in-coil, for example out of band pairing (OOB). Secure pairing establishes a pairing via the wireless RF media such as the BT or WLAN for P2P communication. Once the encryption keys are exchanged via the coil-in-coil, the coil-in-coil has completed its' role in the secure pairing, and then a secure pairing can be established between the host and the accessory via the RF media. Hence, once removed from the radio 108, the accessory 106 and radio 108 communicate using short range wireless communications in a secure manner.

The coil-in-coil 100 provides a way to contactlessly transfer energy between the radio host 108 and accessory 106 for charging and for data communication as long as the accessory is seated inside the host. Once the radio host 108 and accessory 106 are separated they do not have any interaction via the coils. The only interaction will be via the wireless RF media, such as the BT or WLAN, thru the air and from distance.

The coil-in-coil 100 of the various embodiments advantageously provides the capability of charging, passive ID reading, secure pairing, and proximity communications, all through a common interface using a common transmit coil and operating at the same frequency.

Figure 2A:
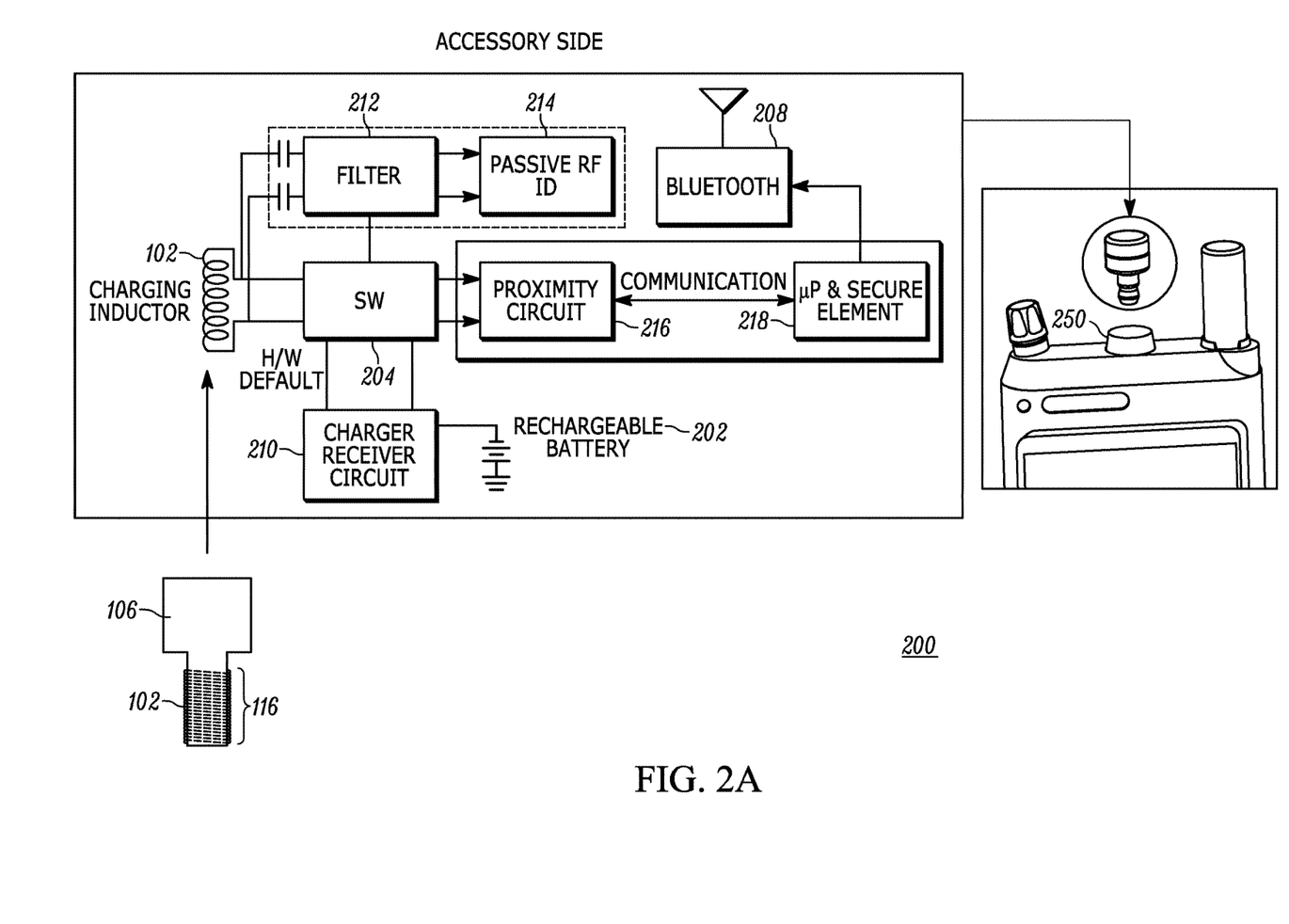
FIG. 2A shows a block diagram for accessory device circuitry in accordance with some embodiments.

FIG. 2A shows a block diagram for accessory device circuitry 200 on the accessory side in accordance with some embodiments. Accessory device circuitry 200 comprises receive coil 102 as previously described, rechargeable battery 202, a switch 204, a microprocessor 206, a short range communication device 208, such as BLUETOOTH, charger receiver circuit 210, a filter 212 and passive RF ID 214. A proximity circuit 216 and microprocessor 218 communicate and control with the other elements of the accessory in order to interface with the radio side. The short range communication device 208 could be other short range communication technologies such as WLAN, proprietary short range communication, near field standard communications, such as ISO14443 to name a few. The receive coil 102 is formed, as previously described as being a helical coil wrapped around the plug-in portion 116 of the accessory 106. Receive coil 102 provides three functions including charging, secured pairing and passive ID reading. Receive coil 102 operates as a charging inductor for the rechargeable battery 202 and further provides secured pairing of the accessory to the radio and passive ID reading of accessory type or the identity of the user.

The switch 204 switchably couples the receive coil (charging inductor) 102 to the microprocessor 206 for controlling secure element and proximity circuit 216, or switchably couples the receive coil 102 (charging inductor) to the charger receiver circuit 210. Secure proximity communication can be based on predetermined proprietary communications or general NFC standard, such as ISO14443. The proximity circuit 216 may be formed of known circuitry to provide detection of nearby objects without any physical contact. For example, the proximity circuit 214 may comprise a detector, demodulator, oscillator and inductive sensor. The coil-in-coil generates a burst of transient energy in response to the extraction or insertion operation that is detected by the proximity circuit 216. A polling method to interrogate the accessory to get acknowledge of presence may also be added if desired.

The secure proximity communication can work on for example frequencies of 13.56 MHz or 125 kHz, the OOB pairing and wireless charging using the same range of frequency. Utilizing the same charging frequency as that of the proximity communications frequency to leverage the same coil for the two functions. In other words, communications frequencies and charging frequencies are able to utilize the same coil based on a selecting the same frequency of operation for both. The short range communications, BLUETOOTH or WLAN, are enabled and disabled based on the success or failure of the secured pairing.

Figure 2B:
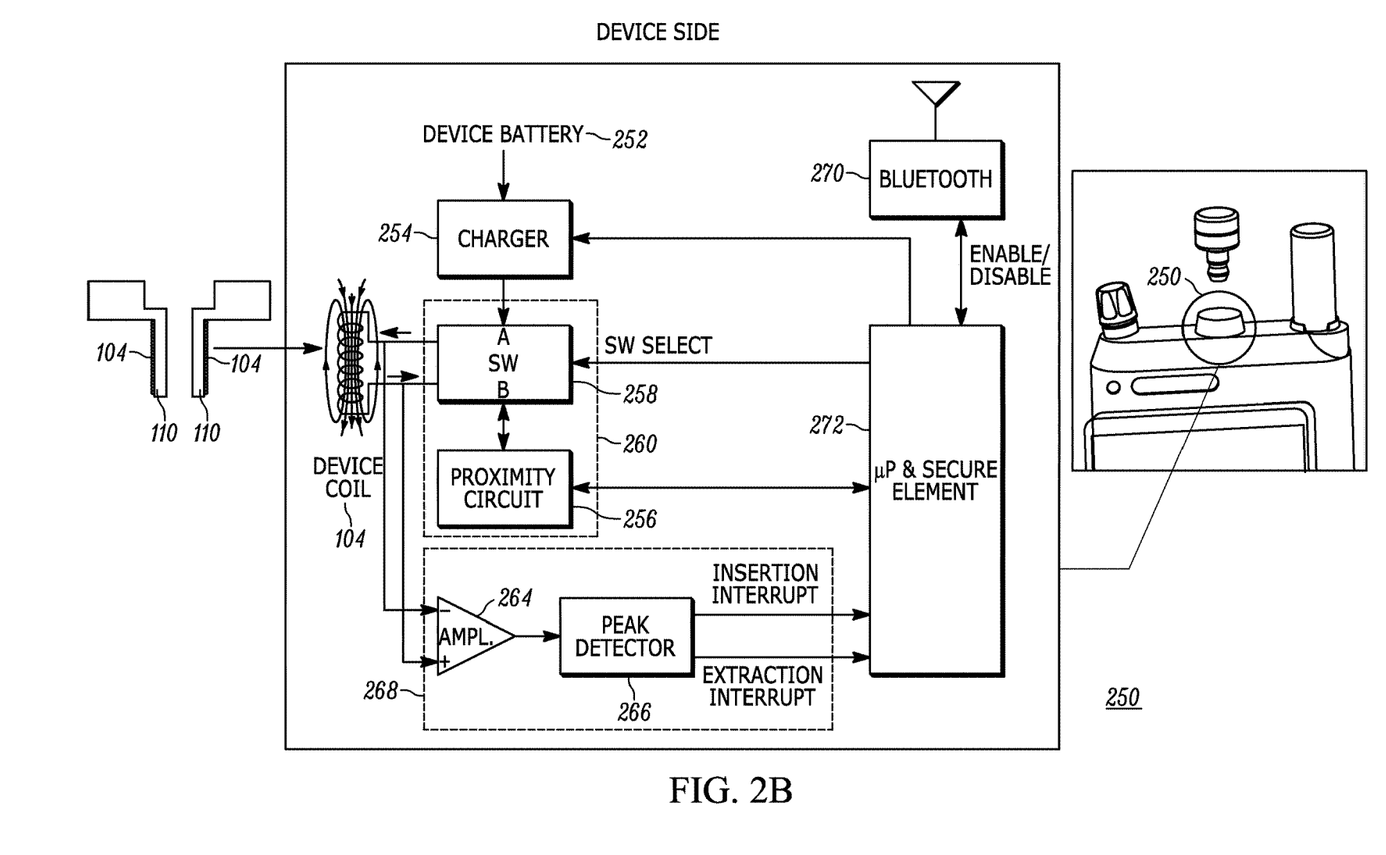
FIG. 2B shows a block diagram for host device circuitry in accordance with some embodiments.

FIG. 2B shows a block diagram for host device circuitry 250 on the host communication device side in accordance with some embodiments. Host device circuitry 250 comprises transmit coil 104, a battery 252, charger circuitry 254, a proximity circuit 256, and a switch 258. The proximity circuit 256 is switchably enabled/disabled by switch 258 for secure pairing 260. The transmit coil 104 is formed, as previously described as being a helical coil wound about the host port 114. The host device circuitry 250 further comprises an amplifier 264 and peak detector 266 for the insertion and removal detection 268 of the accessory receive coil from the host device. The host device circuitry 250 further comprises a short range module, here shown as BLUETOOTH module 270, which along with the other host device circuitry 250, is under control of a microprocessor 272. Other short range modules may be used instead of or in addition to the BT module 270. Secure pairing, accessory input/output detection and passive ID reading are all performed using the same wireless transmit charging coil 104 to perform the operation.

In accordance with some embodiments, the proximity circuit 256 could operate in single band or dual band such as 125 kHz and/or 13.56 MHz in order to allow the communication with the accessory via the same charging coil. The default state for the host device circuitry 250 is set for wireless charging, the processor 272 can switch to proximity communication once the battery (of the accessory) has a predetermined minimum energy level that allows communication. Thus, proximity communication can begin without the accessory having been fully charged. Proximity communication is not short range communication, but rather communication taking place between respective circuit blocks and the coil-in-coil. Secure pairing is achieved via encryption keys being passed by the radio/host device to the accessory via the coil-in-coil so that once the keys pass, then the short range communication (BT or WLAN) can have an encrypted secure voice/date communication once removed. Thus, the same port can interchangeably accommodate a BT accessory and a WLAN accessory.

Figure 3:
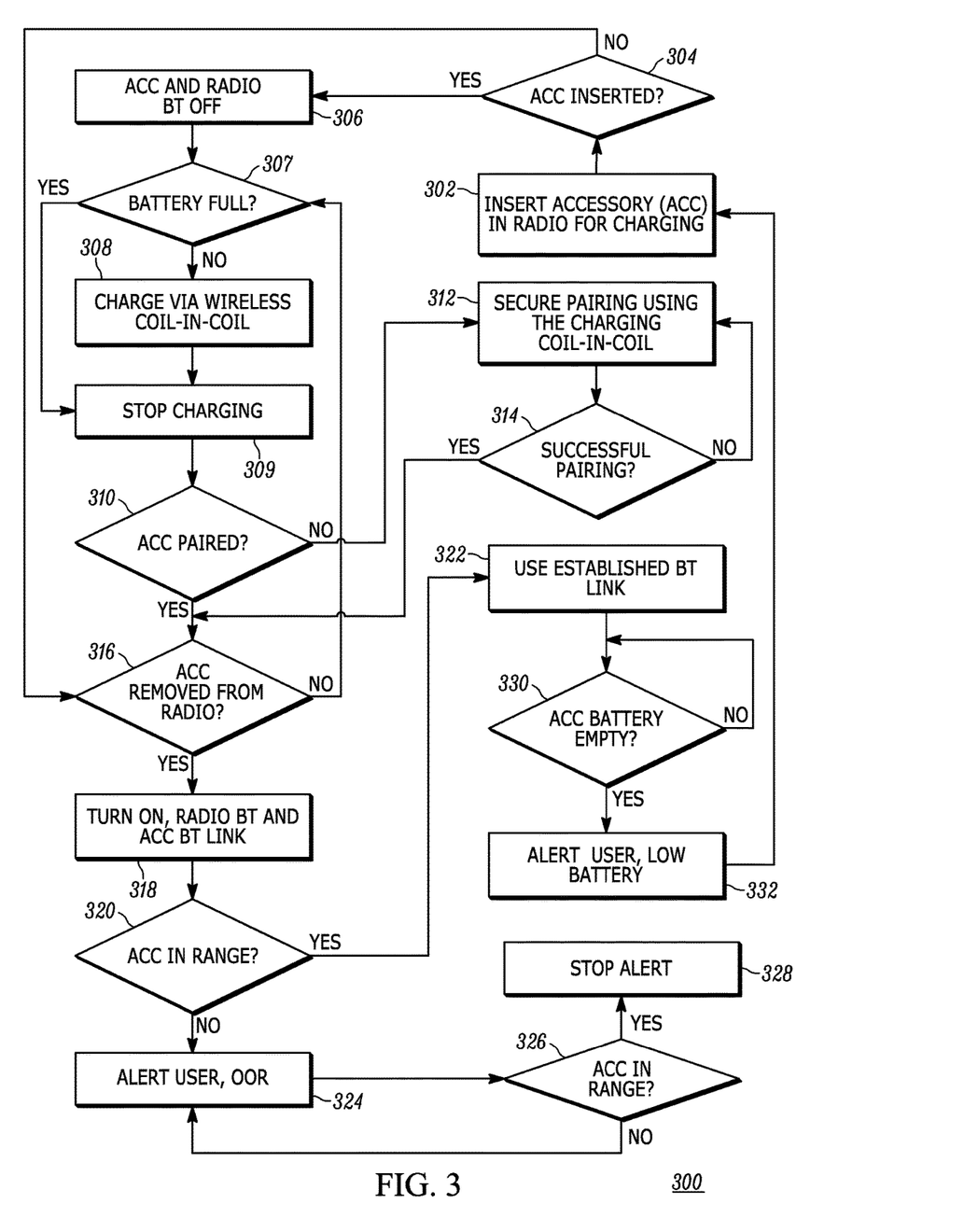
FIG. 3 is a method for a wireless charging coil-in-coil to be utilized for charging and secure pairing of an accessory in accordance with some embodiments.
Figure 4:
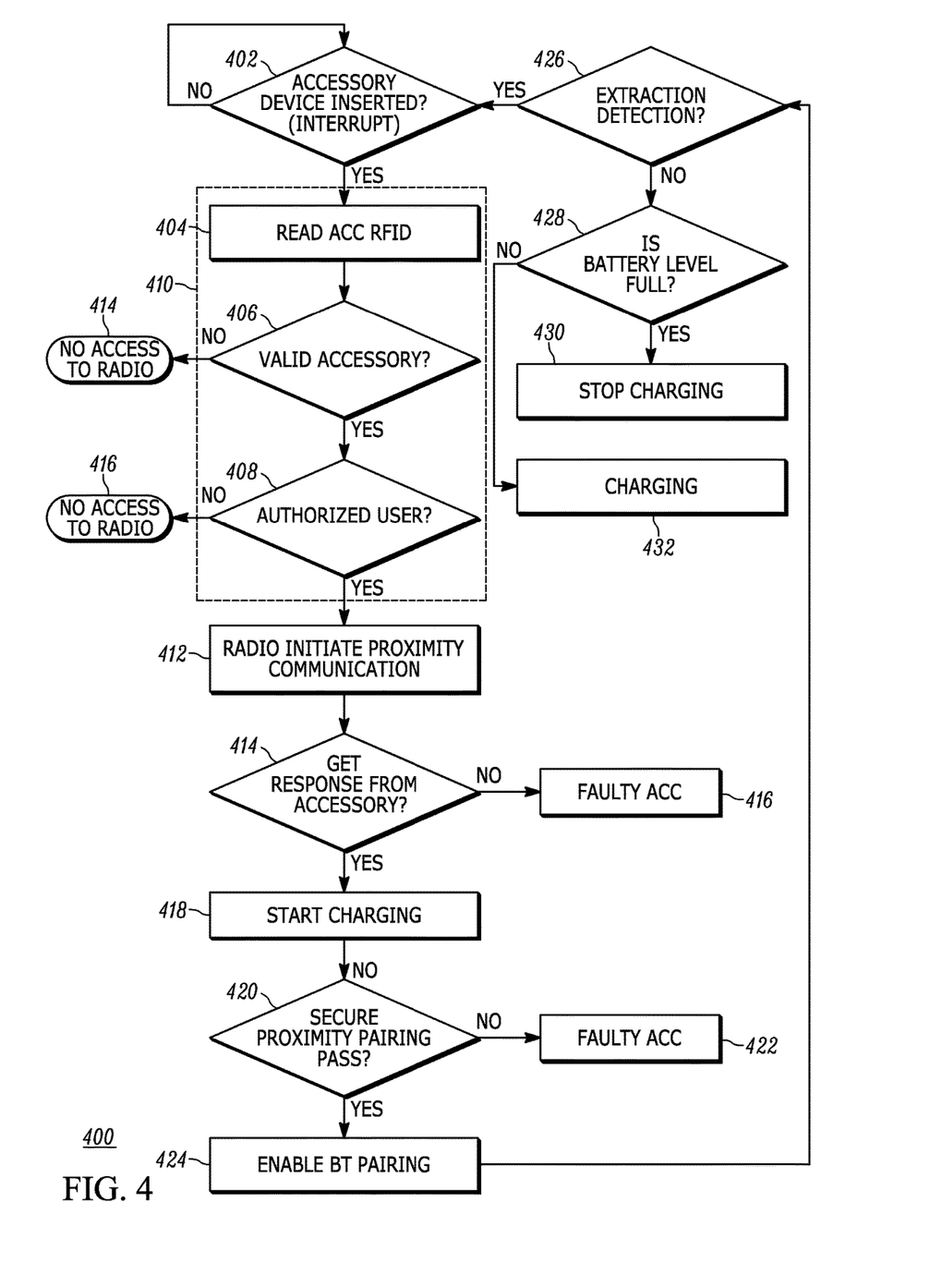
FIG. 4 is a method providing an example of control from the radio side, providing RFID, proximity communication, and charging.
Figure 5:
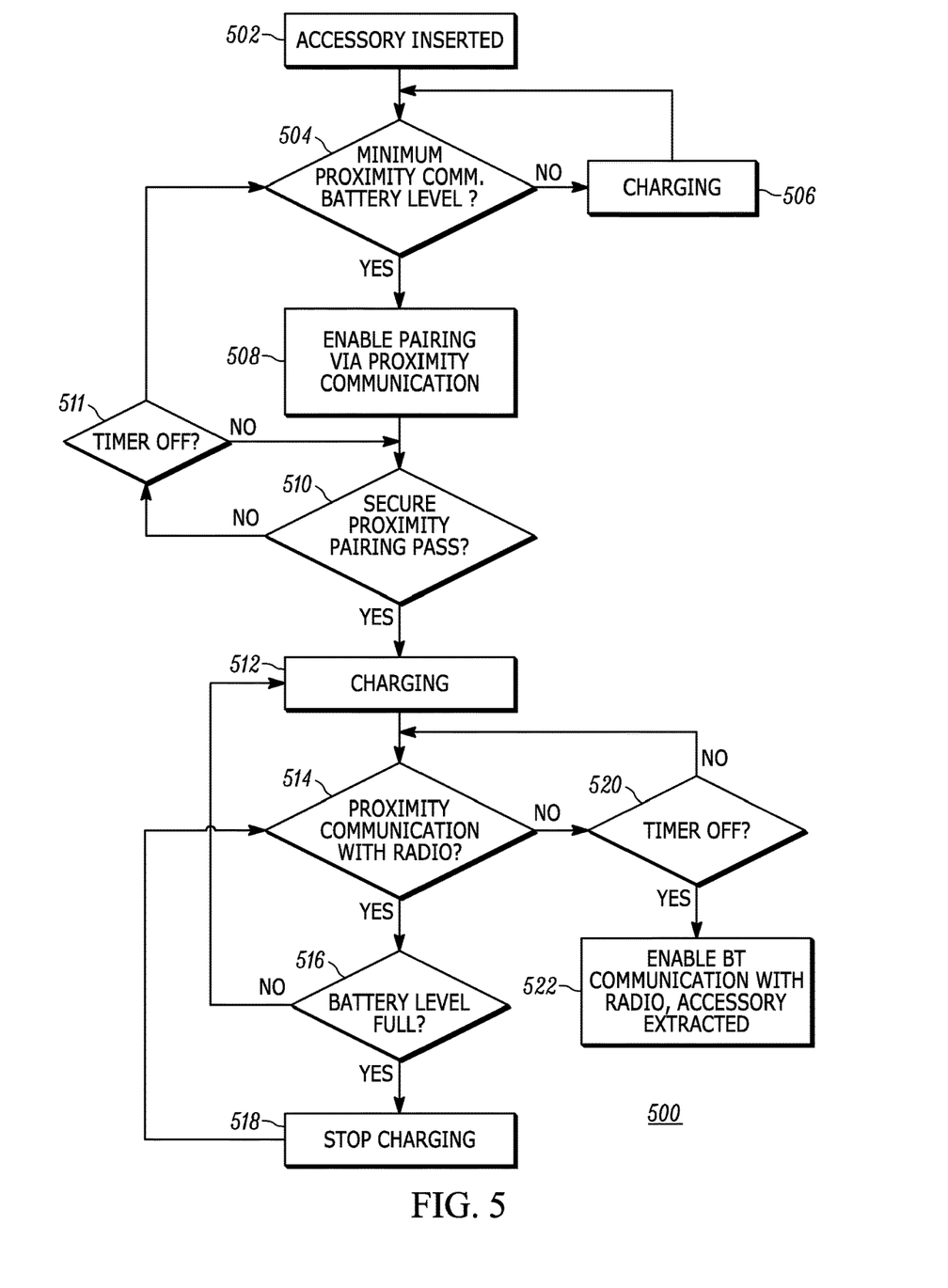
FIG. 5 is a method providing an example of control from the accessory side, providing proximity communications and charging.

Various methods are provided to illustrate and describe how the coil-in-coil can be used for insertion detection, accessory identification, charging and secured pairing of the accessory within the radio in accordance with various embodiments. FIG. 3 is a method 300 for a wireless charging coil-in-coil to be utilized for charging and secure pairing of an accessory in accordance with some embodiments. During charging of the accessory, secure pairing of the accessory to the radio may, if desired, take place simultaneously. FIG. 4 provides an example of control from the radio side, provides RFID, proximity communication, and charging. FIG. 5 provides an example of control from the accessory side, providing proximity communication and charging. During accessory charging the proximity communication is disabled and vice versa. The three methods 300, 400, 500 are provided as examples of wireless charging and secure pairing and are not intended to be limiting. Briefly, and in accordance with the various embodiments, the methods 300, 400, 500 allow for an accessory having a receive coil to the inserted into a host radio device having a transmit coil to form a coil-in-coil structure. The methods provide for identifying the type of accessory, charging of the accessory, and secured pairing of the accessory to the radio using the coil-in-coil.

FIG. 3 is a method 300 for the wireless charging coil-in-coil to be utilized for secure pairing of an accessory to a communication device in accordance with some embodiments. The accessory may be, for example, an earbud or other accessory which during normal operation would communicate with a communication device, such as radio, via short range communications. While the method 300 describes BLUETOOTH it is understood that this could be any short range communications. At 302, the accessory is inserted into the radio charging port for charging. The radio detects at 304 whether the accessory is inserted. If the accessory is inserted at 304, then BT communications, if any, are turned off at 306, and a battery check is made at 307. If the battery is not fully charged at 307, then wireless charging of the accessory begins via wireless conductive charging coil-in-coil at 308.

As the accessory begins to be charged at 308, or if it is determined that the battery is already fully charge at 309, a determination is made as to whether the accessory is paired to the radio at 310. If pairing has not yet occurred at 310, then secure pairing using the charging coil-in-coil takes place at 312. This secure pairing ensures that only appropriate devices are paired with the radio.

If secure pairing is successful as determined at 314, then the method goes to 316 where the radio monitors for removal of the accessory from the radio. Once the accessory is removed from the radio at 316, short range communications between the radio and the accessory are enabled at 318, such as for example BT communications or WLAN communications. If the accessory is not removed from the radio, the method can loop back to 307 for further battery check and charging.

In accordance with various embodiments, the enabled BLUETOOTH communication between accessory and radio further comprises detecting whether the accessory is within range of the radio at 320, such as located within a user's ear, and establishing a BLUETOOTH link at 322. If the accessory is determined to be out of range of the radio at 320, then an out of range (OOR) alert is generated at 324. This OOR alert can be visual or audible and generated by the radio and/or the accessory. The alert(s) can also be generated bi-directionally such that both the radio and the accessory provide an out of range indication alert to the user.

The in/out of range alert 324 and range check at 326 continues until the accessory is brought back in range, thereby causing the alerts to stop at 328. This out of range alert by the radio can also indicate a lost/theft alert. Likewise, an out of range alert can be generated by the accessory. Once in range and the BT link is established at 322, a battery check of the accessory is made at 330. If a low battery of the earbud is determined at 330, then a low battery alert is provided to the user at 332. If the accessory is determined have a low battery at 330, then a low battery alert is generated at 332. This alert can be visual or audible and generated by the radio and/or the accessory. The low battery alert(s) can also be generated bi-directionally such that both the radio and the accessory provide low battery indication alerts to the user.

The communication system of method 300 lends itself well to covert or undercover operations in that indicators, radio and accessory LEDs can be programmed to turn off in response to sensors sensing diminishing light and darkness.

FIG. 4 is a method 400 from the device side in accordance with some embodiments. Method 400 begins at 402 by detecting that an accessory device in inserted into the radio. For example, the insertion of the accessory into the radio would be detected by interrupt circuitry at 268 of FIG. 2B. If such an interrupt is detected at 402 then the radio proceeds to a security check at 410. The security check 410 may comprise one or more checks to verify the authenticity of the accessory and/or the user. At 404, the radio reads the accessory for a radio frequency identification (RFID), as well as verifying whether the type of accessory is valid at 406, and whether the user is an authorized user at 408.

In accordance with some embodiments, the RFID verification at 404 may utilize the coil-in-coil to read a radio ID or may utilize the coil-in-coil as part of a user permissions check for radio configuration. Radio configuration based on user permissions, for example may allow applications or channels to be configured based on the RFID. The RFID can read by the transmit coil using near field communication (NFC). By using the single coil for charging and for data transmission it is possible to energize and galvanically provide power via the coil to the passive "RF ID Tag" to read the information stored in the memory of an NFC chip for application such as configuring the device with user permissions, identify the type of accessory and apply the right actions.

Returning back to method 400, a valid accessory type at 406 and authorized user verification at 408 are all part of the security check 410 performed by the radio. If any of the identifications are deemed invalid then access is not provided to the radio at 414 and 416.

If validity is confirmed from security check 410, the radio then initiates proximity communications at 412. The proximity communication from the radio to the inserted accessory seeks out a response, and if no response is generated within a predetermined amount of time then a faulty accessory is determined at 416. If a response is detected at 414 then charging of the accessory commences at 418 and secure pairing commences at 420. If the secure pairing of the radio and accessory is not successful within a predetermined amount of time at 420, then again a faulty accessory is determined at 422. If secure pairing is deemed successful—a pass at 420, then short range pairing can be enabled at 422, such as the enablement of BT pairing. In this example, the pairing is done via the BT modules 208, 270 of the devices, and to ensure secure the encryption keys are exchanged via the coil-in-coil 100, this protects the security of pairing and prevents eavesdroppers from stealing the encryption keys.

When the accessory is extracted at 426, the radio and accessory can thus communicate using a wireless BLUETOOTH link. The coil-in-coil 100 plays no role in the actual BT communications link while the two devices are separated. If the accessory remains inserted within the radio, a determination is made as to the battery level at 428 and if full charging will cease at 430, and if not then charging will continue at 432.

FIG. 5 is a method 500 for a wireless charging coil to be utilized for secure pairing of an accessory in accordance with some embodiments. Method 500 is representative of the accessory side and begins at 502 by inserting the accessory into the radio and checking at 505 for a minimum accessory battery level that will support proximity communications. Proximity communications are those occurring between devices which are not physically touching each other, in this case between the radio transmit coil and the accessory receive coil in conjunction with the proximity control circuits being switched within the accessory device. The proximity circuits provide the communication protocol between the radio and accessory, i.e. modulation and frequency). If the accessory battery level is not high enough at 504, then the accessory battery begins being charged at 506. If the accessory battery level is sufficiently high at 504, then pairing is enabled at 508 via proximity communication.

The enabled paired communication is checked at 510 to see if it passes security. Secure proximity communication can be based on proprietary communication or general NFC standard such as ISP 1443. The secure communication can work on 13.56 MHz or 125 kHz. If security is not passed at 510 after a predetermined amount of time at 511, then the method returns to monitoring the accessory battery level at 504. Hence, a sufficient amount of charge has been used to verify the secure pairing of the accessory to the radio.

Next, at 512 the accessory continues to be charged while proximity communication with the radio is checked at 514. The charging frequency is the same as that of the proximity communications to leverage the same coil for the two functions. In other words, communications and charging functionality are both provided using the same frequency. This is due to the coil-in-coil structure.

Once the battery level is determined to be full at 516, the charging of the accessory battery can stop at 518. However, once proximity communications have been disrupted at 514 and further verified by a predetermined amount of time at 520, the resulting assumption is that the accessory has been extracted from the radio and hence BLUETOOTH communications are now enabled at 522. It should be noted, an accessory can be removed from the radio (a 'no' at 514) and BLUETOOTH communications can begin between the accessory and the radio (522) prior to the battery of the accessory being fully charged.

Figure 6:
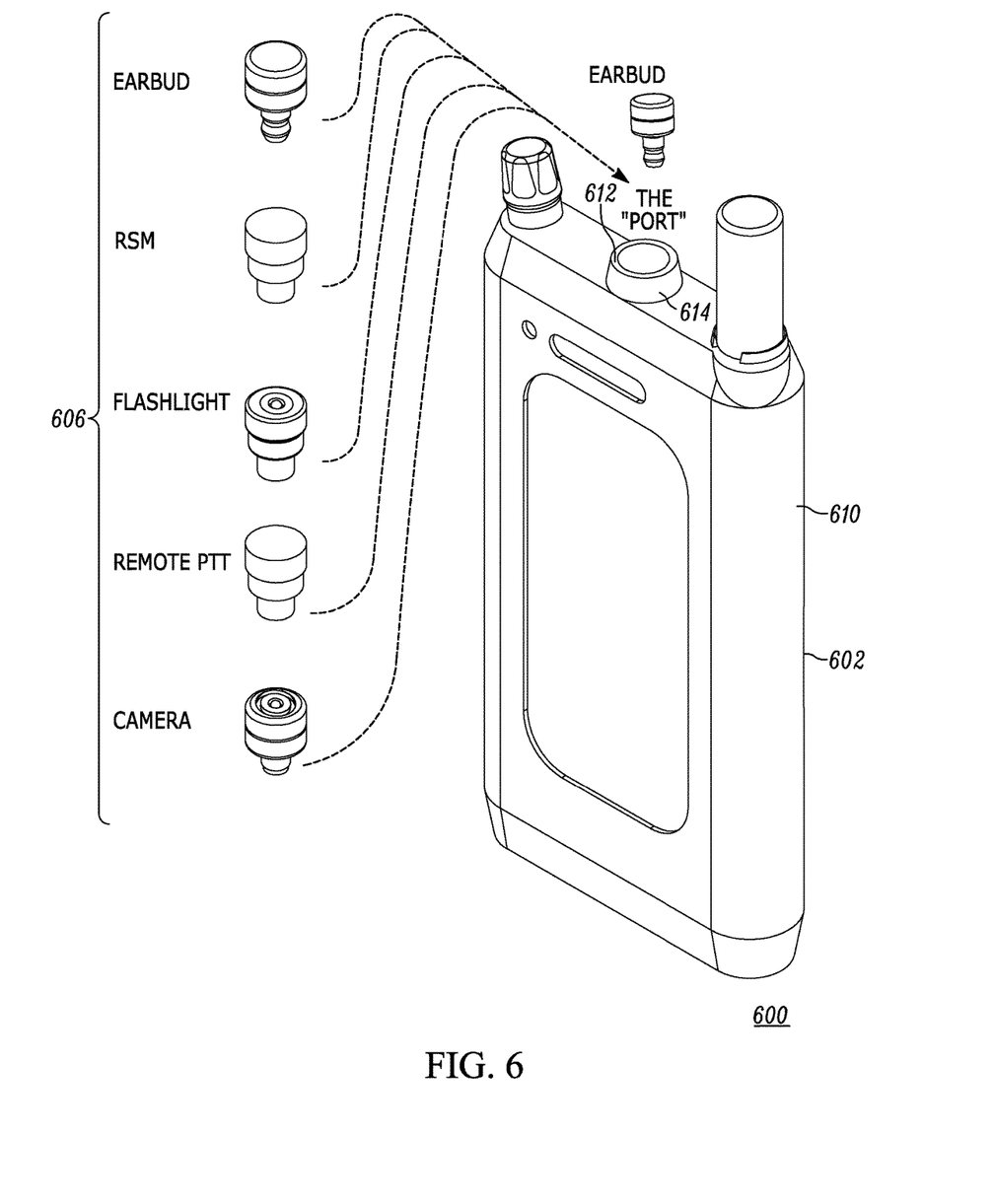
FIG. 6 is a communication system formed and operating in accordance with the various embodiments.

FIG. 6 is a communication system 600 formed and operating in accordance with the various embodiments. Communication system 600 comprises a radio 602, such as a land mobile radio (LMR) formed of radio housing 610 having an aperture 612 leading into a host port 614 for interchangeably receiving a plurality of different accessories 606. The host port 614 is surrounded by a helical transmit coil 104 internal to the housing as previously described in conjunction with FIG. 1. Each of the plurality of accessories 606 is interchangeably insertable within the host port 614. Each of the plurality of interchangeable accessories 606 has a receive coil 102 formed therein as previously described in FIG. 1, which upon insertion within the host port 614 of the radio 602 forms a coil-in-coil structure.

In accordance with the various embodiments, the radio 602 provides wireless charging of the inserted accessory and further provides expanded system functionality of secured pairing. The expanded functionality to the wireless charging may also include but not be limited to: passive ID reading, insertion/removal detection, and proximity communication.

For example, wireless charging of an earbud accessory 606 can occur simultaneously with a radio frequency identification (RFID) of the earbud being read; wireless charging of a miniature remote speaker microphone (RSM) can occur simultaneously with BLUETOOTH OOB secure pairing of the RSM being enabled; wireless charging of a flashlight can occur simultaneously with extracted operation of a camera and earbud in parallel (note: only the one accessory can be charged while inserted to the product, yet multiple accessories can interact with the radio after extracted from the radio); wireless charging of a remote push-to-talk (PTT) can occur simultaneously with BT secure pairing of the RSM; wireless charging of a mini-camera can occur simultaneously with RFID reading of the mini-camera. Other examples include but are not limited to a fingerprint scan and an alcohol sensor. These are just a few examples and are not intended to be construed as limiting.

For secured pairing, the host device passes to the accessory encryption keys via the transmit coil so that one the keys are passed, then the BT or the WLAN can utilize an encrypted secure voice and or data communication.

Accessories that are applicable to the public safety market, including law enforcement and first responder rescue, are particularly well suited to the expanded functionality provided by the various embodiments. Accessories that are used in undercover, covert operations would also benefit from the communication system 600 having the coil-in-coil structure providing charging and secure pairing of one or more accessories through the single host port 614. While the devices are charged separately (one at a time) the remote, extracted operation can take place in parallel.

Once, the accessory 606 is removed from the radio, the enabled technology can commence operation between the two devices. For example, the radio 602 and the accessory 606 can begin short range communications over WLAN or BT technologies. For example, a securely paired radio and mini camera, can now communicate over a Secure P2P WLAN Video communication. The same host port 614 is able to accommodate both WLAN and BT type accessories when they return back to the host for charging and/or secure pairing verification.

In accordance with the various embodiments, the single transmit coil providing both charging of the accessory as well as providing for expanded functionality allows for a single interface host port 614 to accommodate both charging and expanded functionality of an accessory. The single transmit coil 104 and host port 614 beneficially accommodate different technologies, for example charging and secure pairing. The single interface and transmit coil 104 also support the interchangeability of a plurality of different accessory devices 606 operating over different technologies through the use of a single transmit coil 104.

Battery levels of the accessory are monitored while the device is operating remotely (removed from housing) and alerts provided to the user upon predetermined conditions of low battery. If the accessory is moved too far away from the host device, an out of range alert can be generated to alert the user of the out of range condition in order to bring the device in closer proximity to the radio.

In accordance with the various embodiments, the ability to wirelessly charge an accessory while triggering expanded functionality to either the host radio device and/or the accessory devices using the coil-in-coil wireless charging structure has advantageously allowed the same transmit coil on the radio side to be re-used to accommodate different technologies and devices.

In a further embodiment, one or more of the accessories 606 may be programmed as a smart key. Once the accessory is inserted into the host port 614 of the radio 602, then the key on the accessory becomes a key of the radio device so that it can be used as a programmable key. A combination of predefined presses or clicks, such as one click, two clicks, a short click followed by a long press on the accessory invokes specific communication actions, predefined by the user.

Communication system 600 thus advantageously provides multiplexed expanded functionality by switching between charging to secure pairing, while the presence detection and RFID reading can be done simultaneously to either charging or secure pairing using the same coil structure. The electronic communication device may be a portable electronic device other than a radio that can provide charge capability for an accessory via a power source. For example, electronic communications pad, electronic eyeglasses, or other portable device that can operate as a host device to wireless electronic accessories. In accordance with some embodiments, the battery (of the accessory) is being charged by the electronic transmit coil of the radio, wherein the same transmit coil is being used to provide expanded functionality to the system. In accordance with some embodiments, the electronic device can accept a plurality of different interchangeable accessories—the same transmit coil of the radio being used to charge each accessory and the same transmit coil of the radio being used to provide expanded functionality in conjunction to the charging.

In accordance with a further embodiment of extended functionality, a miniature accessory of the plurality of miniature accessories 606 may further operate as physical interface for channel selection of the radio 606. For example, once one of the accessories 606 is seated in the host port 614, rotation of the accessory within the port left or right (clockwise or counterclockwise) will select and switch land mobile radio (LMR) channel or groups. The same accessory may further provide channel or group section soft knob functionality via the short range communication when it is separated from the host port 614. The selector can be physically implemented using a hall effect with tiny magnets, or other means such as, for example, through the use of opto-couplers or by mechanical design using springs. A sample device was fabricated using the magnet implementation using an earbud accessory and radio host port and shown to work.

The communication system 600 lends itself well to public safety applications, such as undercover law enforcement activities and covert operations, where the utilization of small accessories and secure pairing are highly important to land mobile radio operations.

In the past, technologies and standards such as RFID, NFC, and BT OOB required very specific software, as well as electronic and mechanical arrangements to support their usage and did not support wireless charging. Additionally, wireless charging standards, such as A4WP and Qi STD, do not provide for secure pairing. Now, through the coil-in-coil configuration provided by the various embodiments, both wireless charging and secure pairing are advantageously supported.

The same coil-in-coil can be used for a BLUETOOTH accessory, a WLAN accessory, Zigbee accessory, or none to provide the services of wireless communications, the port provide services of charging, RDIF reading, removal/insertion detection and secure pairing to the accessory as long as the accessory is compatible to the host port 614 from mechanical, electrical and software design using the same exact coil-in-coil.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An apparatus, comprising:
a coil-in-coil structure formed between two portable electronic devices, the coil-in-coil structure enabling both wireless charging and secure pairing between the two portable electronic devices, wherein the wireless charging and secure pairing occur contactlessly using the same coil-in-coil structure.

2. A communication system, comprising:
a portable radio having an aperture leading into a host port;
a transmit coil surrounding the host port;
a portable accessory having a receive coil insertable into the host port of the portable radio thereby forming a coil-in-coil structure for enabling two or more wireless functionalities, the two or more wireless functionalities being enabled contactlessly using the same coil-in-coil structure.

3. The communication system of claim 2, wherein the two or more wireless functionalities enabled by the coil-in-coil structure comprise: battery charging of the portable accessory and secure pairing the portable accessory to the portable radio, wherein the wireless charging and secure pairing occur contactlessly using the same coil-in-coil structure.

4. The communication system of claim 3, wherein the securely paired portable accessory is removable from the host port of the portable radio for engaging in secure short range wireless communications with the radio.

5. The communication system of claim 2, wherein the two or more wireless functionalities comprise wireless charging and at least one of: secure pairing, RFID reading, portable accessory input/output detection, proximity communication, BLUETOOTH pairing, and P2P WLAN pairing.

6. The communication system of claim 4, wherein the portable accessory comprises a physical knob that provides channel or group selection functionality when inserted into the host port of the radio and further provides channel or group selection soft knob functionality via short range communication when separated from the host port of the radio.

7. The communication system of claim 2, further comprising:
a rechargeable battery in the portable accessory; and
proximity circuitry in the portable accessory, and
a wireless charger receiver in the portable accessory wherein the rechargeable battery of the portable accessory is charged at a frequency that is the same frequency as a proximity communications frequency of the proximity circuitry thereby leveraging use of the transmit coil of the coil-in-coil structure for both wireless charging and proximity communications.

8. The communication system of claim 2, wherein short range communications between the portable accessory and the portable radio are enabled and disabled based on successful secured pairing.

9. The communication system of claim 2, wherein the portable accessory comprises a programmable security key providing for a combination of predefined presses or clicks on the portable accessory to invoke user-predefined communication actions.

10. The communication system of claim 2, wherein extended radio functionality comprises at least one of: RFID/NFC reading, enabling secure pairing for secure BT Voice Communication with the portable accessory, enabling secure pairing for P2P WLAN Video communication with the portable accessory.

11. The communication system of claim 2, wherein the portable accessory comprises:
an RFID chip; and
wherein the proximity communication of the radio via the coil-in-coil structure reads the RFID chip using near field communication protocol (NFC), the RFID chip providing accessory type identification and end user identity which triggers radio configuration based on user permissions.

12. The communication system of claim 2, wherein the portable accessory comprises one of: an earbud, a miniature camera, a remote push-to-talk (PTT), a remote speaker microphone (RSM), a flashlight, a fingerprint scanner, an alcohol sensor.

13. The communication system of claim 2, wherein the portable accessory is interchangeable and comprises one of:
   a BLUETOOTH accessory; and
   a WLAN accessory;
   an electronic accessory without radio frequency (RF) communication.

14. The communication system of claim 2, wherein the portable radio comprises a radio helical coil and the accessory comprises an accessory helical coil.

15. The communication system of claim 2, wherein wireless charging occurs when the portable accessory is inserted into the aperture of the host port forming the coil-in-coil structure and in response to a low battery detection of the portable accessory.

16. The communication system of claim 2, wherein coil-in-coil is used to determine secure pairing.

17. The communication system of claim 2, wherein the portable radio and portable accessory communicate over a short range communications link when accessory is removed from the radio, and the radio and accessory are within a predetermined range of each other.

18. The communication system of claim 2, wherein the portable radio provides a low battery accessory alert when the portable accessory has a low battery even when the accessory is disconnected from the portable radio but within the short range communications of the portable accessory.

19. The communication system of claim 2, wherein the portable radio provides a lost/theft accessory alert when the portable accessory has exited a short range communications range of the portable accessory.

20. A method for wirelessly controlling a portable radio and a portable accessory, comprising:
   inserting the portable accessory having a helical receive coil into the portable radio having a helical transmit coil, thereby forming a coil-in-coil;
   detecting the insertion of the portable accessory into the portable radio using the coil-in-coil;
   identifying the portable accessory type inserted within the portable radio using the coil-in-coil;
   charging the portable accessory using the coil-in-coil; and
   secure pairing the portable accessory to the radio using coil-in-coil, wherein the wireless charging and secure pairing occur contactlessly using the same coil-in-coil.

21. The method of claim 20, further comprising:
   removing the portable accessory from the radio;
   detecting the removal of the portable accessory from the radio using the coil-in-coil; and
   communicating between the radio and the portable accessory over a short range wireless link, the short range communications being securely paired.

22. The apparatus of claim 1, wherein the secure pairing provides for an exchange of encryption keys via the coil-in-coil.

23. The apparatus of claim 1, wherein the coil-in-coil structure further enables passive ID reading.

24. The apparatus of claim 1, wherein the coil-in-coil structure comprises a transmit coil and receive coil which do not physically touch each other.

25. The communication system of claim 2, wherein the two or more wireless functionalities enabled by the coil-in-coil structure further comprises passive ID reading of the portable accessory type or the identity of a user.

26. The communication system of claim 2, wherein the coil-in-coil structure formed of the radio transmit coil and the portable accessory receive coil do not physically touch each other.

27. The communication system of claim 3, wherein the secure pairing provides for an exchange of encryption keys via the coil-in-coil.

28. The communication system of claim 7, wherein wireless charging and secure pairing occur using the same coil-in-coil structure prior to the portable accessory being extracted from the portable radio for securely paired short range communications.

29. The communication system of claim 7, wherein the receive coil operates as a charging inductor for the rechargeable battery of the portable accessory and further provides secured pairing of the portable accessory to the portable radio and passive ID reading of accessory type or the identity of the user.

30. The method of 20, wherein the secure pairing provides for an exchange of encryption keys via the coil-in-coil.

31. The communication system of claim 20, wherein the coil-in-coil formed of the portable accessory having a helical receive coil of the portable accessory and the helical transmit coil of the portable radio do not physically touch each other.

* * * * *